US010365348B2

(12) United States Patent
Markel et al.

(10) Patent No.: US 10,365,348 B2
(45) Date of Patent: Jul. 30, 2019

(54) ENCAPSULATED ELECTRONIC WARFARE ARCHITECTURE

(71) Applicant: Raytheon Company, Waltham, MA (US)

(72) Inventors: Matthew Markel, Culver City, CA (US); Nicholas A. Bedio, Amherst, NH (US); Michael Anthony Sangillo, Jr., Nashua, NH (US); Jeffery Jay Logan, Cuver City, CA (US); Michael Fina, Manhattan Beach, CA (US); Tyler Linden Rather, Redondo Beach, CA (US); Tyler Miller, Gardena, CA (US)

(73) Assignee: Raytheon Company, Waltham, MA (US)

( * ) Notice: Subject to any disclaimer, the term of this patent is extended or adjusted under 35 U.S.C. 154(b) by 736 days.

(21) Appl. No.: 14/958,104

(22) Filed: Dec. 3, 2015

(65) Prior Publication Data

US 2017/0160379 A1 Jun. 8, 2017

(51) Int. Cl.
*G01S 7/02* (2006.01)
*G01S 7/38* (2006.01)
*H04K 3/00* (2006.01)

(52) U.S. Cl.
CPC ............... *G01S 7/021* (2013.01); *G01S 7/38* (2013.01); *H04K 3/45* (2013.01); *H04K 3/825* (2013.01);
(Continued)

(58) Field of Classification Search
CPC ....................................................... G01S 7/021
(Continued)

(56) References Cited

U.S. PATENT DOCUMENTS 4,217,580 A * 8/1980 Lowenschuss ......... G01S 7/021
342/13
5,122,801 A 6/1992 Hughes
(Continued)

FOREIGN PATENT DOCUMENTS

| EP | 1291667 B1 | 12/2007 |
| WO | WO-2005031615 A2 | 4/2005 |
| WO | 2017105584 | 6/2017 |

OTHER PUBLICATIONS

"International Application Serial No. PCT/US2016/055152, International Search Report dated May 19, 2017", 5 pgs.
(Continued)

*Primary Examiner* — Marcus E Windrich
(74) *Attorney, Agent, or Firm* — Schwegman Lundberg & Woessner, P.A.

(57) ABSTRACT

Electronic devices and a method of providing electronic warfare (EW) data in an encapsulated architecture in a vehicle are generally described. Emitters targeting the vehicle during a mission may be detected and an observable history of each emitter obtained as a function of time. Properties of each emitter may be both inferred based on the observable history and extracted from locally-stored pre-mission intelligence. The emitter properties, as well as current and historical state and threat level of the emitter and effectiveness of various countermeasures may be stored in an adaptive radar model (ARM) for the emitter. Each emitter may have its own ARM. The ARM may be used to take appropriate countermeasures for a particular emitter, based on the emitter alone or taking into account all of the emitters.

20 Claims, 4 Drawing Sheets

(52) U.S. Cl.
CPC .............. *H04K 3/827* (2013.01); *H04K 3/94* (2013.01); *H04K 2203/16* (2013.01); *H04K 2203/18* (2013.01); *H04K 2203/22* (2013.01)

(58) Field of Classification Search
USPC ........................................................ 342/159
See application file for complete search history.

(56) References Cited

U.S. PATENT DOCUMENTS

| | | | |
|---|---|---|---|
| 5,287,110 A | 2/1994 | Tran | |
| 6,788,243 B2 | 9/2004 | Lavoie | |
| 6,917,325 B2 | 7/2005 | Gounalis | |
| 7,068,209 B2* | 6/2006 | Gounalis | G01S 7/021 342/13 |
| 7,148,835 B1 | 12/2006 | Bricker et al. | |
| 7,248,203 B2 | 7/2007 | Gounalis | |
| 7,412,361 B2 | 8/2008 | Rachlin | |
| 7,626,538 B2 | 12/2009 | Rose | |
| 7,830,297 B1* | 11/2010 | Wang | G01S 7/021 342/13 |
| 7,843,375 B1 | 11/2010 | Rennie et al. | |
| 8,203,478 B1* | 6/2012 | Huneycutt | H04K 3/28 342/14 |
| 8,494,464 B1* | 7/2013 | Kadambe | H04K 3/45 342/14 |
| 8,615,190 B2* | 12/2013 | Lu | H04K 3/45 342/14 |
| 8,935,780 B2 | 1/2015 | Smith | |
| 2004/0130477 A1* | 7/2004 | Gounalis | G01S 7/021 342/13 |
| 2004/0130478 A1* | 7/2004 | Gounalis | G01S 7/021 342/14 |
| 2008/0168480 A1 | 7/2008 | Twoey et al. | |
| 2008/0297394 A1* | 12/2008 | Dark | G01S 7/021 342/13 |
| 2008/0297396 A1* | 12/2008 | Dark | G01S 7/021 342/14 |
| 2009/0224956 A1* | 9/2009 | Dark | G01S 7/021 342/13 |
| 2010/0027715 A1* | 2/2010 | Gounalis | H04W 48/16 375/316 |
| 2014/0159934 A1* | 6/2014 | Rudnisky | H04K 3/00 342/14 |

OTHER PUBLICATIONS

"International Application Serial No. PCT/US2016/055152, Written Opinion dated May 19, 2017", 9 pgs.
"International Application Serial No. PCT/US2016/055152, International Preliminary Report on Patentability dated Jun. 14, 2018", 9 pgs.

* cited by examiner

ENCAPSULATED ELECTRONIC WARFARE ARCHITECTURE

TECHNICAL FIELD

Embodiments pertain to an electronic warfare (EW) system. Some embodiments relate to providing a self-contained EW system.

BACKGROUND

Electronic Warfare (EW) systems process massive amounts of data in short periods of time and play an increasingly important role in modern warfare. It is not uncommon for an airborne EW system to process well over a million pulses in a single second continuously throughout a mission.

Given the complex nature of data clustering and aggregation over a large number of variables within an EW environment, it would be desirable to alter the memory structures in the EW systems to efficiently organize data, information, and intelligence regarding the electronic environment. This organization may enable advanced EW capabilities such as autonomous electronic attack (EA) technique selection, inference of EA effectiveness, sharing with neighboring systems for cooperative attack, and storage for postmission analysis.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
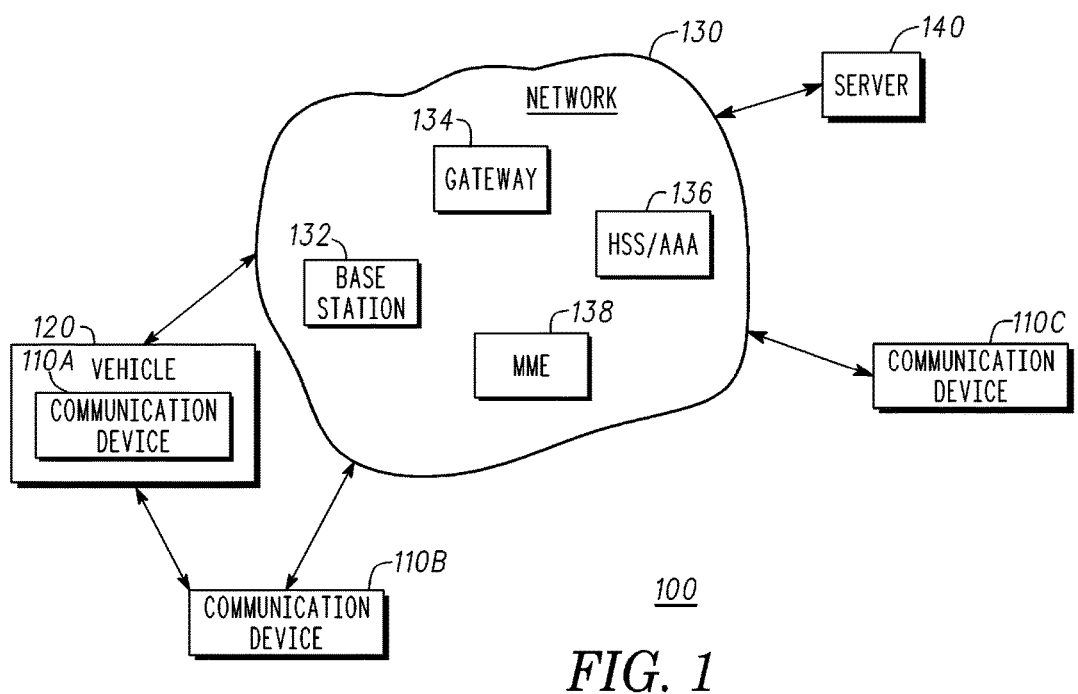
FIG. 1 is a functional block diagram illustrating a system in accordance with some embodiments.
Figure 2:
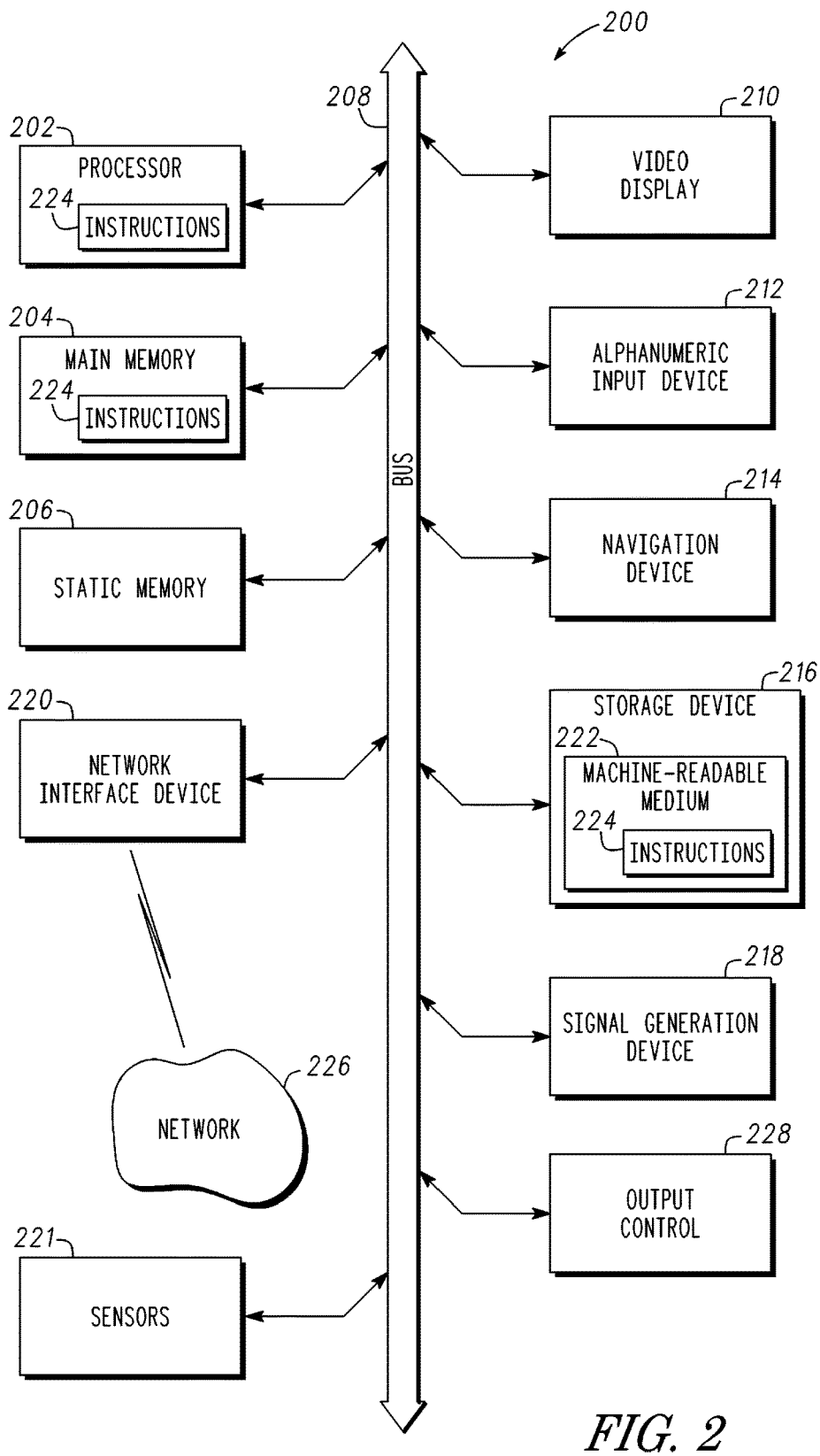
FIG. 2 illustrates a block diagram of a communication device in accordance with some embodiments.

FIG. 1 is a functional block diagram illustrating a system in accordance with some embodiments. FIG. 1 is a functional block diagram illustrating one embodiment of a network 100 in which communication devices 110a, 110b, 110c communicate with other communication devices and/or one or more servers 140 wirelessly and/or through a wired connection. The communication devices 110a, 110b, 110c may communicate with each other directly or through one or more networks 130. The communication devices 110a, 110b, 110c may communicate locally, for example, via one or more micro, pico or nano base stations (BSs) or access points (APs) or directly using any of a number of different techniques, such as WiFi (or using IEEE 802.11 standards), Bluetooth or Zigbee, among others. Alternatively, the communication devices 110 may also communicate through the network 130 via Third Generation Partnership Project Long Term Evolution (3GPP LTE) networks and LTE advanced (LTE-A) networks, $4^{th}$ generation (4G) networks or $5^{th}$ generation (5G) networks. Examples of communication devices 110a, 110b, 110c include, but are not limited to, mobile devices such as portable handsets, smartphones, tablet computers, laptop computers, and wearable devices. In some embodiments, one or more of the communication devices 110a, 110b may be embedded within one or more vehicles, such as vehicle 120, for example airplanes used in modern warfare and may be an EW system. As shown in FIG. 2, an EW communication device may also comprise sensors and user I/O components as well as multiple processors (among others) in the vehicle 120. The server 140 may provide audio and/or video content or support for applications running on the wireless device 110a, 110b, 110c or may be part of a centralized EW system, containing data and models for the vehicle 120 to use.

The network 130 may have all of the features, hardware, and systems of networks, however, only a few elements in the network 130 are shown for exemplary purposes. The network may contain a base station (which may be e.g., an enhanced NodeB or eNB) 132, a gateway 134 (serving and/or home gateway), a Home Subscriber Server (HSS) 136, and a Mobility Management Entity (MME) 138, among others. The base station 132 may provide the initial point of connection to the network 130 by each wireless device 110a, 110b, 110c. The HSS 136 may be a database of user (subscriber) information, i.e., customer profiles and provide authentication for use of the network 130 by a particular wireless device 110a, 110b, 110c. The user information may include account information, account status, user preferences, features subscribed to by the user, user's current location, and allowable APNs. The HSS 136 may provide the user profile to a Mobility Management Entity (MME) 138, which controls network access of the communication devices 110a, 110b, 110c through the gateway 134. The network 130 may also contain various servers that provide content or other information related to user accounts.

FIG. 2 illustrates a block diagram of a communication device in accordance with some embodiments. In some embodiments, the communication device 200 may be the communication device shown in FIG. 1, and may be a computer configured to perform any one or more of the techniques during transaction events discussed herein. In alternative embodiments, the communication device 200 may operate as a standalone device or may be connected (e.g., networked) to other computers. In a networked deployment, the communication device 200 may operate in the capacity of a server, a client, or both in server-client network environments. In an example, the communication device 200 may act as a peer machine in peer-to-peer (P2P) (or other distributed) network environment. The communication device 200 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. Although not shown, the main memory 204 may contain any or all of removable storage and non-removable storage, volatile memory or non-volatile memory. The communication device 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The communication device 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the communication device 200. In an example, one or any combination of the hardware processor 202, the main memory 204, the static memory 206, or the storage device 216 may constitute machine readable media.

While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. Note that the above are merely exemplary types of communication standards and connections and the list provided is intended to be exemplary, using any terrestrial or satellite-based communication techniques and systems, for example.

As above, the communication device may be embedded within a vehicle used in EW, such as military land, sea or air vehicles configured to gather intelligence data and perform other missions. During missions, the communication device be used offensively or defensively. For example, the data gathered by the EW system may be used for instantaneous assessment of target systems to determine whether to take offensive or defensive action against one or more of the target systems. Defensive measures taken may include, for example, jamming an enemy electronic system to decrease the quality of measurements performed by the system and decrease the chances of detection or targeting by the system. Offensive measures may include more stringent methods of avoiding (e.g., by route alteration of the vehicle) or eliminating the offending systems.

To effect opportunistic use of the EW system, a vast amount of data from enemy systems may be obtained and processed in situ during a mission. The EW system may obtain signals that originate from known or unknown sources, evaluate the signals based on EW information stored in its memory and determine a desired course of action to either take appropriate measures automatically or indicate to the user one or more actions to take (and perhaps information about the enemy systems) and wait for the user to respond with the appropriate course of action.

The EW system may undertake several different categories of operations in electronic support (ES) and EA techniques. These operations may include, among others, signal detection, signal identification, and signal tracking during ES and technique development, technique selection, parameter tracking and effectiveness during EA. Due to the huge amount of data being processed during a mission, it may be undesirable to offload processing and decision-making processes to achieve the desired real-time operation. This may be, in particular, an issue in situations in which an unknown emitter (radar or source of illumination) actively targets or illuminates the vehicle containing the EW system. The decision of whether a particular emitter is targeting the vehicle may thus depend on the vehicle detecting illumination (e.g., pulses) received from the emitter at the vehicle. The unknown emitter may be a newly-installed emitter for which, for example, no additional countermeasures are to be taken, e.g., due to the lack of information or duplicative information able to be provided about the vehicle in which the EW system is disposed. Alternatively, the unknown emitter may be, for example, an advanced radar or tracking system in which additional electronic countermeasures (ECM) may be incorporated that increase the capability of the emitter with respect to the vehicle containing the EW system.

The information with which the EW system may have to work may be merely radio frequency signal (e.g., pulse) data and perhaps geographic data. Thus, the RF signals alone may be processed by the EW system to identify the source and determine the nature of the RF signals, whether threatening or non-threatening, and determine the appropriate action to take. However, the EW system may receive a tremendous amount of raw observables—millions of pulses/second—and act upon them in short order. More specifically, the EW system may digitize the pulses, separate and filter the pulses into individual sources using stored sets of parameters, match the sources to known emitters, assess ambiguities between the known signals and unknown signals, determine location and probable type and capabilities of each source, and determine and take appropriate countermeasures for each source. It may thus be impracticable and potentially catastrophic to offload any EW functionality offsite (i.e., off the vehicle) to assess an unknown emitter, manage data from the emitter or determine a course of action. Typically, offline assessment and updates to existing EW models containing mission data files and indicating active emitter in a particular geographic region may take weeks or months as human analysis may be used. As traditional EW systems use static Mission Data Files (MDF) that may map the electromagnetic environment to known threats and have predetermined EA responses, out-of-library threats such as the new emitter may render the traditional EW approach unusable as there is no known EA response. Observable processing, that may track active emitters, may be linked to the MDF and may employ strategy, EA intent, and over-the-air observables to determine the effectiveness of EA response against in-library and out-of-library threats. Although the term determine or determined is used herein, in some embodiments, quantitative aspects of the system herein such as the effectiveness or values may be estimated from known or estimated probability functions. Thus, in such cases, the term known and the term estimated may be used interchangably.

Thus, the EW system shown in FIG. 1 may perform assessment and management of the data and operations on such emitters through the use of an encapsulated architecture called an Adaptive Radar Model (ARM). The ARM may leverage the principles of object oriented design to provide a structured aggregation of data (both observable and file-based) and a series of methods from which derived information can be calculated, stored, and shared among the various elements of the EW system. The ARM may categorize known and unknown emitters, manage information of the emitters, estimate the effectiveness of an EA and determine which EA technique to use. After the mission, or at a point in time in which the vehicle containing the EW system is able to safely communicate, the derived information may be shared with EW systems in other nearby vehicles or with a central coordinating server, such as server 140 shown in FIG. 1.

The ARM may store as Pulse Descriptor Words (PDWs) emitter parameters that have been observed, as well as the amount of time the emitter has illuminated the EW system. In addition, the ARM may incorporate information about the performance capabilities of the emitter (either through pre-mission planning, inference within a mission, or both) to enable calculation of emitter detection ranges, potential degradation from jamming, etc. As emitters become observable, each emitter, whether known or unknown, may be categorized and managed by being assigned a separate ARM to maintain the aggregated information about it. By encapsulating all information about each such emitter, multiple cognitive functions can be brought to the engagement, including emitter state estimation, robust EA technique choice, EA effectiveness inference, current threat level, and/or automatic or manual route adjustment for the present or future missions. The ARM may aggregate data from different sources (e.g., current mission data as well as tabled data) into separate structures for each emitter, which may facilitate sharing for on-mission distributed learning and off-line analysis. Advanced EW functions may be provided as separate modules that may be added or deleted independent of this data mechanism. This may result in highly sharable, adaptive mission data files for multiple threat systems.

Figure 3:
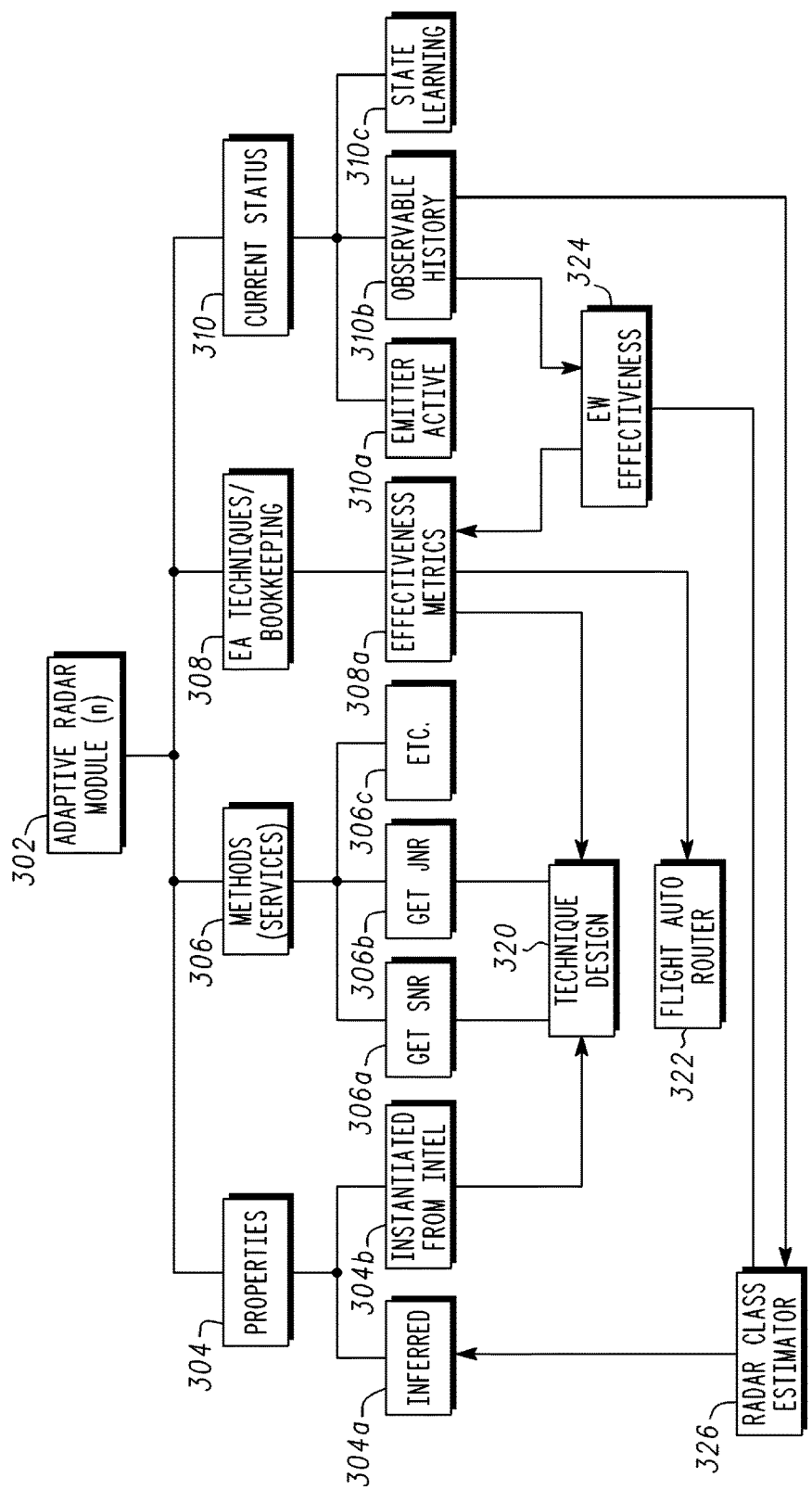
FIG. 3 illustrates an adaptive radar model of an EW system in accordance with some embodiments.

FIG. 3 illustrates an adaptive radar model of an EW system in accordance with some embodiments. The EW system may contain an ARM 302 for each emitter seen by the EW system, with the ARMs running in parallel. The adaptive radar model 302 may be a data management architecture that resides in an electronic component of the vehicle and that aggregates information. Thus, for example, if the vehicle encounters multiple emitters, the multiple adaptive radar models may operate in parallel. The adaptive radar model 302 may be stored in the memory and processed by the processor shown in FIG. 2, for example.

The adaptive radar model 302 may evaluate and respond to the emitter. In particular, the adaptive radar model 302 may determine and aggregate information including properties 304 of the emitter, services 306 provided by the EW systems that are related to the emitter, EA techniques 308 for use of different techniques on the emitter and current states 310 of the emitter.

In particular, the properties 304 may include both properties inferred 304a from the pulses (e.g., frequency, rate used) as well as those instantiated from other intelligence methods (e.g., pre-mission intelligence data) 304b. This latter input into the adaptive radar model 302 may be obtained prior to commencement of the mission or reception of the pulses from the emitter. The properties may be stored in a file in a memory of the EW system accessible using a properties object of the adaptive radar model 302.

The adaptive radar model 302 may also access the various methods or services 306 provided by the emitter. The adaptive radar model 302 may obtain the expected signal-to-noise ratio (SNR) 306*a*, jammer-to-noise ratio (JNR) 306*b* or other characteristics 306*c* for the emitter given a particular countermeasure taken by the EW system.

The adaptive radar model 302 may also access various bookkeeping or EA techniques 308 information of the EW system for countermeasures against the emitter. This may include the effectiveness of countermeasures the vehicle or others may have employed against the emitter and the corresponding results. This may permit the EW system to determine that a particular technique has been effective in the past as a countermeasure. The bookkeeping 308 information may indicate various metrics of effectiveness of the different countermeasures against different types of emitters. The bookkeeping 308 information may also be stored in a file in a memory of the EW system accessible using a bookkeeping object of the adaptive radar model 302.

The adaptive radar model 302 may also determine or estimate the current states 310 of the emitter as a function of time. The current states 310 of the emitter may include whether the emitter is currently active 310*a* (e.g., after jamming), what the observable history of the emitter 310*b* is, and whether the states 310*c* (e.g., search, track, ID) of the emitter have been determined by the adaptive radar model 302. The current states 310 may also be stored in a file in a memory of the EW system accessible using a current states object of the adaptive radar model 302. The observable history of the emitter 310*b* may include, for example, PDW, EDW, JDW, and received illumination power. The current states 310 information may provide both the current level of activity and the historic level of activity of the emitter.

Various objects of the adaptive radar model 302 may be combined to result in a decision regarding what countermeasure to take currently about the emitter. This is to say that known and inferred data of the emitter may be aggregated to better characterize the threat level of the emitter and choose one or more available EA techniques. For example, the observable history 310*b* may be used to estimate the class 326 of the unknown emitter. The classes of the emitter may include, for example, early warning radar, fire control radar, and missile seeker. Part of determining the emitter class includes inferring the performance attributes of the emitter.

Once the emitter class has been estimated, the emitter properties may be inferred using the inferred emitter properties object 304*a*. In addition, the estimated emitter class 326 may be combined with the observable history 310*b* of the emitter to determine the effectiveness 324 of various countermeasures available to the EW system. The effectiveness 324 may subsequently be added to the effectiveness metrics 308*a*.

The effectiveness metrics 308*a* of the various countermeasures for the emitter may be combined with the SNR 306*a* and JNR 306*b* determinations and any properties of the emitter that may have been independently instantiated 304*b* to determine the appropriate technique(s) (countermeasures) 320 to take for that emitter. This may include adjusting navigation of the vehicle 322, e.g., rerouting the flight automatically or indicating to a user that rerouting is desirable (perhaps with the reason why), based on the determined effectiveness metrics 308*a*. Note that to reroute the path of the vehicle, the adaptive radar model 302 may cause the EW system to interact with the navigation system of the vehicle.

In some embodiments, adaptive radar model 302 may determine the most advantageous course of action based on only the emitter. This may occur when the emitter is the sole emitter—no other sources of illumination are local to the emitter. In some embodiments, the adaptive radar model 302 of the EW system may not make the determination in isolation. This is to say that, when multiple sources of illumination are present, the adaptive radar model 302 and EW system may take into account not only what countermeasures may be most effective for a particular emitter, but also how these measures may affect other existing sources of illumination. The adaptive radar model 302 of the EW system may accordingly select a less optimal countermeasure (or no countermeasure) for one or more of the sources of illumination to achieve an optimal set of countermeasures for all of the sources of illumination. For example, automated rerouting may adjust the vehicle route from an initial route farther than may be warranted for a particular emitter to increase the effectiveness for other emitters that might not have been an issue for the initial route but may have been for a revised route minimally impacting the initial route. Similarly, while rerouting may be the most desirable countermeasure for one emitter, the vehicle may use a less-effective jamming technique to minimize visibility to other nearby emitter rather than rerouting and increasing visibility to that emitter.

The data of the emitter obtained and analyzed by the adaptive radar model 302 and/or the resulting countermeasure determination may be shared in real time with other vehicles during a mission using a predetermined RF or optical link to enable cooperative countermeasures and joint operations to be undertaken by the vehicles (and possibly other forces). Similarly, the information of the EW system regarding the emitter may be offloaded after a mission through a dedicated communication port and/or link.

Figure 4:
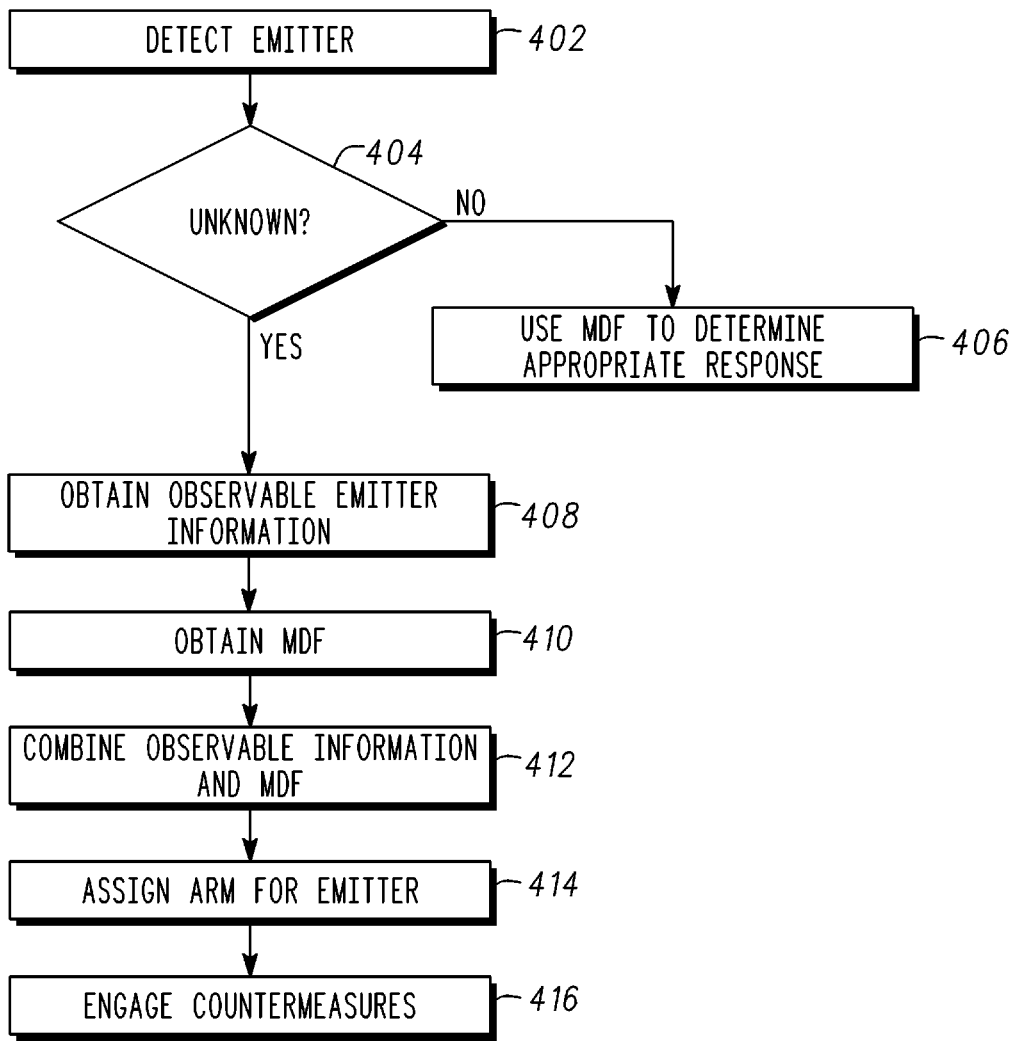
FIG. 4 illustrates a flowchart of using an encapsulated EW architecture in accordance with some embodiments.

FIG. 4 illustrates a flowchart of using an encapsulated EW architecture in accordance with some embodiments. The process shown in FIG. 4 may be performed by the EW system in the vehicle shown in FIG. 1, for example. The method shown in FIG. 4 may occur when the vehicle is on a mission, for example. At operation 402, the EW system may detect the presence of one or more emitters or emitters.

In response to detecting the presence of an emitter, at operation 404 the EW system may determine whether the emitter is known or unknown. Known emitters may have an associated MDF stored by the EW system.

If the EW system determines that the emitter is known, the EW system at operation 406 may call an object of the adaptive radar model corresponding to the emitter. The MDF of the emitter may thus be extracted and the appropriate countermeasures determined to take for that emitter.

If the EW system determines that the emitter is unknown, the EW system at operation 408 may call multiple objects of the adaptive radar model to determine various aspects of the unknown emitter. The adaptive radar model may determine whether the emitter is active as well as calling up and saving the observable history, such as attributes of the emitter, raw observables (pulses) from the emitter, information about the interplay between the raw observables and countermeasures (jamming waveforms), that is, the manner in which the raw observables change in time with countermeasures. The adaptive radar model may be able to infer properties of the emitter.

The EW system may then call up MDFs 410 for various emitters to be used to determine further information. The observable history and other emitter characteristics may be compared with the MDF of known emitters at operation 412. The EW system may, for example, determine the emitter class of the emitter and determine effectiveness of various countermeasures by calculating a detection range and potential degradation of the emitter from different jamming techniques based on the combined information.

The combined information may then be aggregated into a single file. The aggregated information may be assigned and stored separately in an ARM at operation 414. The stored ARM information may be shared among platforms and eventually offloaded after the mission. The stored ARM information may thus include the observed emitter parameters and amount of time that the emitter has illuminated the vehicle, as well as performance capabilities of the emitter obtained through one or both pre-mission planning and inference within a mission. The stored ARM information may be disseminated at a later date, either during the mission or after termination of the mission for later intelligence update. By encapsulating all of the information about an emitter using a single ARM, multiple cognitive functions may be able to be brought, including state estimation of the emitter, robust EA technique choice, inferences about EA effectiveness, and current threat level of the emitter.

At operations 416, once the effectiveness of the various countermeasures are determined using the stored information, the EW system may engage the vehicle to take the appropriate countermeasures, if available. The determination may include, for example, whether or not jamming measures may be underpowered, so that countermeasures may be unproductive.

In some embodiments, the countermeasures may be taken automatically. In some embodiments, the countermeasures may be initiated through user response. In some embodiments, some or all of the countermeasures may be taken through a combination of automatic initiation by the EW system and through user response. The EW system may, in some embodiments, not make the determination of countermeasures in isolation, instead determining the countermeasures based on a combination of threats in the vicinity of, or otherwise affecting, the vehicle. In such cases, the EW system may prioritize the various emitters and respond to only certain of the emitters.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method of employing electronic warfare (EW) data in an encapsulated architecture of an EW system in a vehicle, the method comprising:
   detecting, by a detector of the EW system in the vehicle, an active emitter targeting the vehicle by at least in part detecting illumination received from the emitter at the vehicle;
   deciding whether or not the emitter is a known or unknown emitter;
   in response to deciding that the active emitter is an unknown emitter, obtaining an observable history of the emitter while the emitter is targeting the vehicle;
   inferring in a processor of the EW system in the vehicle properties of the emitter from the observable history;
   aggregating information of the emitter, including the properties and the observable history of the emitter and response and effectiveness of countermeasures to the emitter, and storing the aggregated information in an adaptive radar model (ARM) as Pulse Descriptor Words (PDWs) in a memory of the EW system, each ARM associated with aggregated information of a different emitter and able to adjust information regarding countermeasures to an associated emitter based on new information obtained regarding the associated emitter, the ARMs running in parallel to permit multiple countermeasures to be undertaken simultaneously; and taking appropriate countermeasures based on at least some of the aggregated information, wherein the ARM causes the EW system to interact with a navigation system of the vehicle when the appropriate countermeasures comprise automatically rerouting the vehicle.

2. The method of claim 1, further comprising:
determining one or more countermeasures for the vehicle to take based on the aggregated information, the aggregated information further including current state of the emitter and current threat level of the emitter, the current state comprising search, track, or identify, the countermeasures determined by calculating expected signal-to-noise ratio (SNR) and jammer-to-noise ratio (JNR) for each countermeasure taken by the EW system.

3. The method of claim 1, wherein:
the observable history of the emitter includes raw observables and the manner in which the raw observables change with countermeasures as a function of time.

4. The method of claim 1, further comprising:
determining a radar class based on at least some of the aggregated information, the response and effectiveness of countermeasures dependent on the radar class.

5. The method of claim 1, wherein:
taking the appropriate countermeasures comprises taking into account other emitters targeting the vehicle, the appropriate countermeasures for the emitter when the other emitters illuminate the vehicle are less optimal than the appropriate countermeasures for the emitter when the other emitters do not illuminate the vehicle.

6. The method of claim 1, wherein:
the emitter is an unknown emitter, and
the ARM is compiled during a mission such that the ARM for the unknown emitter is available locally during the mission.

7. The method of claim 1, wherein:
the EW system comprises pre-mission data specific to a plurality of known emitters,
the ARM, after determining the emitter, includes information from the pre-mission data files into the ARM.

8. The method of claim 1, wherein:
inferring properties of the emitter comprises determining performance capabilities of the emitter through at least one of pre-mission intelligence and inference within a mission, the performance capabilities including emitter detection range and potential degradation from jamming.

9. An electronic warfare (EW) device comprising:
a memory arranged to store an adaptive radar model (ARM) for each of a plurality of emitters, each ARM associated with aggregated information of a different emitter and able to adjust information regarding countermeasures to an associated emitter based on new information obtained regarding the associated emitter the ARMs running in parallel to permit multiple countermeasures to be undertaken simultaneously;
I/O devices arranged to:
  detect an emitter targeting a vehicle during a mission, communicate with a plurality of platforms to download ARM information of the emitter after termination of a mission, and
a processor arranged to:
  obtain an observable history of the emitter as a function of time while the emitter is targeting the vehicle,
  infer properties of the emitter based on the observable history,
  extract other emitter properties from pre-mission intelligence stored in the memory,
  aggregate the inferred and extracted emitter properties and the observable history of the emitter into the ARM as Pulse Descriptor Words (PDWs) for the emitter; and
  take appropriate countermeasures based on at least some of the aggregated information, wherein the ARM causes the EW device to interact with a navigation system of the vehicle when the appropriate countermeasures comprise automatically rerouting the vehicle.

10. The EW device of claim 9, wherein the processor is further arranged to:
determine response and effectiveness of countermeasures to the emitter based on the inferred and extracted emitter properties, the inferred and extracted emitter properties including emitter detection range and potential degradation from jamming, the current state comprising search, track, or identify, the countermeasures determined by calculating expected signal-to-noise ratio (SNR) and jammer-to-noise ratio (JNR) for each countermeasure taken by the EW device, and
aggregate the determined response and effectiveness of the countermeasures to the emitter into the ARM.

11. The EW device of claim 9, wherein the processor is further arranged to:
determine or estimate a current state of the emitter, historical states of the emitter and current threat level of the emitter, and
aggregate the current state of the emitter, historical states of the emitter and current threat level of the emitter into the ARM.

12. The EW device of claim 9, wherein:
the observable history of the emitter includes raw observables and the manner in which the raw observables change as a function of time with countermeasures taken by the EW system.

13. The EW device of claim 9, wherein the processor is further arranged to:
determine response and estimate effectiveness of countermeasures to the emitter,
determine a particular set of countermeasures to take in response to being illuminated by the emitter, and
take the particular set of countermeasures based on the aggregated information, wherein other emitters illuminating the vehicle are taken into account in determining a particular set of countermeasures to take in response to being illuminated by the emitter, the particular set of countermeasures for the emitter when the other emitters illuminate the vehicle less optimal than countermeasures for the emitter when the other emitters do not illuminate the vehicle.

14. A non-transitory computer-readable storage medium that stores instructions for execution by one or more processors of an electronic warfare (EW) device in a vehicle, the one or more processors to configure the EW device to:
detect a plurality of emitters targeting the vehicle during a mission;
for each emitter:
  obtain an observable history of the emitter as a function of time while the emitter is targeting the vehicle, the observable history comprising raw observables and a manner in which the raw observables change as a function of time with countermeasures taken by the EW system;

infer properties of the emitter based on the observable history;

extract other emitter properties from pre-mission intelligence stored in the memory, aggregate the inferred and extracted emitter properties and the observable history of the emitter into an adaptive radar model (ARM) for the emitter and store the aggregated information in the ARM as Pulse Descriptor Words (PDWs) in a memory, each ARM associated with aggregated information of a different emitter and able to adjust information regarding countermeasures to an associated emitter based on new information obtained regarding the associated emitter, the ARMs running in parallel to permit multiple countermeasures to be undertaken simultaneously; and take appropriate countermeasures based on at least some of the aggregated information, wherein the ARM causes the EW system to interact with a navigation system of the vehicle when the appropriate countermeasures comprise automatically rerouting the vehicle.

15. The medium of claim 14, wherein the one or more processors further configure the EW device to:

determine response and estimate effectiveness of countermeasures to the emitter based on the inferred and extracted emitter properties, the inferred and extracted emitter properties including emitter detection range and potential degradation from jamming, and aggregate the determined response and effectiveness of the countermeasures to the emitter into the ARM.

16. The medium of claim 14, wherein the one or more processors further configure the EW device to:

determine a current state of the emitter, historical states of the emitter and current threat level of the emitter, the current state comprising search, track, or identify, the countermeasures determined by calculating expected signal-to-noise ratio (SNR) and jammer-to-noise ratio (JNR) for each countermeasure taken by the EW device, and aggregate the current state of the emitter, historical states of the emitter and current threat level of the emitter into the ARM.

17. The medium of claim 14, wherein the one or more processors further configure the EW device to:

determine response and effectiveness of countermeasures to the emitter, determine a particular set of countermeasures to take in response to being illuminated by the emitter, and take the particular set of countermeasures based on the aggregated information, the particular set of countermeasures for the emitter also taking into account other emitters illuminating the vehicle.

18. The method of claim 1, further comprising:

limiting the EW system to respond to only a predetermined number of detected emitters.

19. The method of claim 1, further comprising:

updating Mission Data Files (MDFs), which map an electromagnetic environment of the EW system to known threats and provide predetermined responses, to incorporate the emitter and effectiveness of responses to the emitter, the emitter having no known response in any of the MDFs.

20. The method of claim 1, further comprising:

sharing in real time, data of the emitter obtained and analyzed by the ARM and a resulting countermeasure determination, with another vehicle during a mission using a predetermined radio frequency or optical link; and undertaking cooperative countermeasures and joint operations by the vehicle and other vehicles.

* * * * *

UNITED STATES PATENT AND TRADEMARK OFFICE
CERTIFICATE OF CORRECTION

PATENT NO. : 10,365,348 B2
APPLICATION NO. : 14/958104
DATED : July 30, 2019
INVENTOR(S) : Markel et al.

Page 1 of 1

It is certified that error appears in the above-identified patent and that said Letters Patent is hereby corrected as shown below:

On the Title Page

Item [72], delete "Cuver" and insert --Culver-- therefor

In the Specification

Column 7, Line 58, delete "322," and insert --120-- therefor

In the Claims

Column 11, Line 55, Claim 9, delete "emitter" and insert --emitter,-- therefor

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*